United States Patent
Fakoorian et al.

(10) Patent No.: US 12,526,604 B2
(45) Date of Patent: Jan. 13, 2026

(54) POSITIONING CAPABILITIES OF REDUCED CAPABILITY NEW RADIO DEVICES

(71) Applicant: Apple Inc., Cupertino, CA (US)

(72) Inventors: Seyed Ali Akbar Fakoorian, San Diego, CA (US); Dawei Zhang, Saratoga, CA (US); Hong He, San Jose, CA (US); Huaning Niu, San Jose, CA (US); Jie Cui, San Jose, CA (US); Kirk Burroughs, Alamo, CA (US); Wei Zeng, Saratoga, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 615 days.

(21) Appl. No.: 17/821,256

(22) Filed: Aug. 22, 2022

(65) Prior Publication Data

US 2023/0063450 A1 Mar. 2, 2023

Related U.S. Application Data

(60) Provisional application No. 63/260,863, filed on Sep. 2, 2021.

(51) Int. Cl.
*H04W 4/029* (2018.01)
*H04L 5/00* (2006.01)
*H04W 8/22* (2009.01)

(52) U.S. Cl.
CPC .......... *H04W 4/029* (2018.02); *H04L 5/0048* (2013.01); *H04W 8/22* (2013.01)

(58) Field of Classification Search
None
See application file for complete search history.

(56) References Cited

U.S. PATENT DOCUMENTS

| 10,327,109 | B1 | 6/2019 | Maheshwari et al. |
| 2017/0238298 | A1 | 8/2017 | Wang et al. |
| 2021/0037573 | A1* | 2/2021 | Ly ..................... H04W 74/0833 |
| 2021/0058890 | A1 | 2/2021 | Akkarakaran et al. |
| 2021/0088623 | A1* | 3/2021 | Yerramalli ............ G01S 5/0236 |

(Continued)

FOREIGN PATENT DOCUMENTS

| CN | 108702275 | 10/2018 |
| CN | 112601970 | 4/2021 |

OTHER PUBLICATIONS

Moderator (Intel Corporation), "Feature Lead Summary#3 for E-mail Discussion [106-e-NR-ePos-06]", 3GPP TSG RAN WG1 #106e, R1-2108294, Aug. 27, 2021, 69 sheets.

(Continued)

*Primary Examiner* — Adolf Dsouza
(74) *Attorney, Agent, or Firm* — Fay Kaplun & Marcin, LLP

(57) ABSTRACT

A reduced capability (redcap) user equipment (UE) is configured to receive a positioning reference signal (PRS) configuration from a network component and perform one or more positioning operations based at least in part on the PRS configuration. A base station is configured to receive, from a location management function (LMF) of a network, a positioning reference signal (PRS) configuration for a reduced capability user equipment (redcap UE) and transmit PRS to the redcap UE based on the PRS configuration.

18 Claims, 4 Drawing Sheets

(56) References Cited

U.S. PATENT DOCUMENTS

2022/0061098 A1* 2/2022 Choi ................. H04L 5/0094
2023/0049735 A1* 2/2023 Lin .................. H04L 5/0053

OTHER PUBLICATIONS

Qualcomm Incorporated, "Type-A HD-FDD for RedCap Ue", 3GPP TSG-RAN WG1 Meeting #105, R1-2104679, May 12, 2021, 11 sheets.
Huawei, HiSilicon, "Positioning enhancement in Rel-17", 3GPP TSG RAN WG1 Meeting #103-e, R1-2007577, Nov. 13, 2020, 17 sheets.

* cited by examiner

POSITIONING CAPABILITIES OF REDUCED CAPABILITY NEW RADIO DEVICES

PRIORITY/INCORPORATION BY REFERENCE

This application claims priority to U.S. Provisional Application Ser. No. 63/260,863 entitled "Positioning Capabilities of Reduced Capability New Radio Devices," and filed on Sep. 2, 2021, the entirety of which is incorporated herein by reference.

BACKGROUND

A new radio (NR) network may support reduced capability (redcap) devices. Generally, a redcap device is not configured with the same features as non-redcap devices. For example, compared to a legacy NR user equipment (UE), a redcap device may have a lower maximum bandwidth, a reduced number of transmit or receive antennas, etc. These types of features provide cost and/or complexity reduction benefits. However, the redcap UEs may still need to provide positioning and/or location services that may be impacted because of the reduced capabilities of the devices.

SUMMARY

Some exemplary embodiments are related to a processor of a reduced capability (redcap) user equipment (UE) configured to perform operations. The operations include receiving a positioning reference signal (PRS) configuration from a network component and performing one or more positioning operations based at least in part on the PRS configuration.

Other exemplary embodiments are related to a processor of a base station configured to perform operations. The operations include receiving, from a location management function (LMF) of a network, a positioning reference signal (PRS) configuration for a reduced capability user equipment (redcap UE) and transmitting PRS to the redcap UE based on the PRS configuration.

Still further exemplary embodiments are related to a location management function of a network configured to perform operations. The operations include determining a positioning reference signal (PRS) configuration for a reduced capability user equipment (redcap UE) communicating with the network, transmitting the PRS configuration to the redcap UE, receiving, from a base station serving the redcap UE, a discontinuous reception (DRX) cycle configuration for the redcap UE and transmitting the DRX cycle configuration of the redcap UE to one or more neighboring base stations to the serving base station, wherein the one or more neighboring base stations align a PRS configuration for the redcap UE based on the DRX cycle configuration.

DETAILED DESCRIPTION

Figure 1:
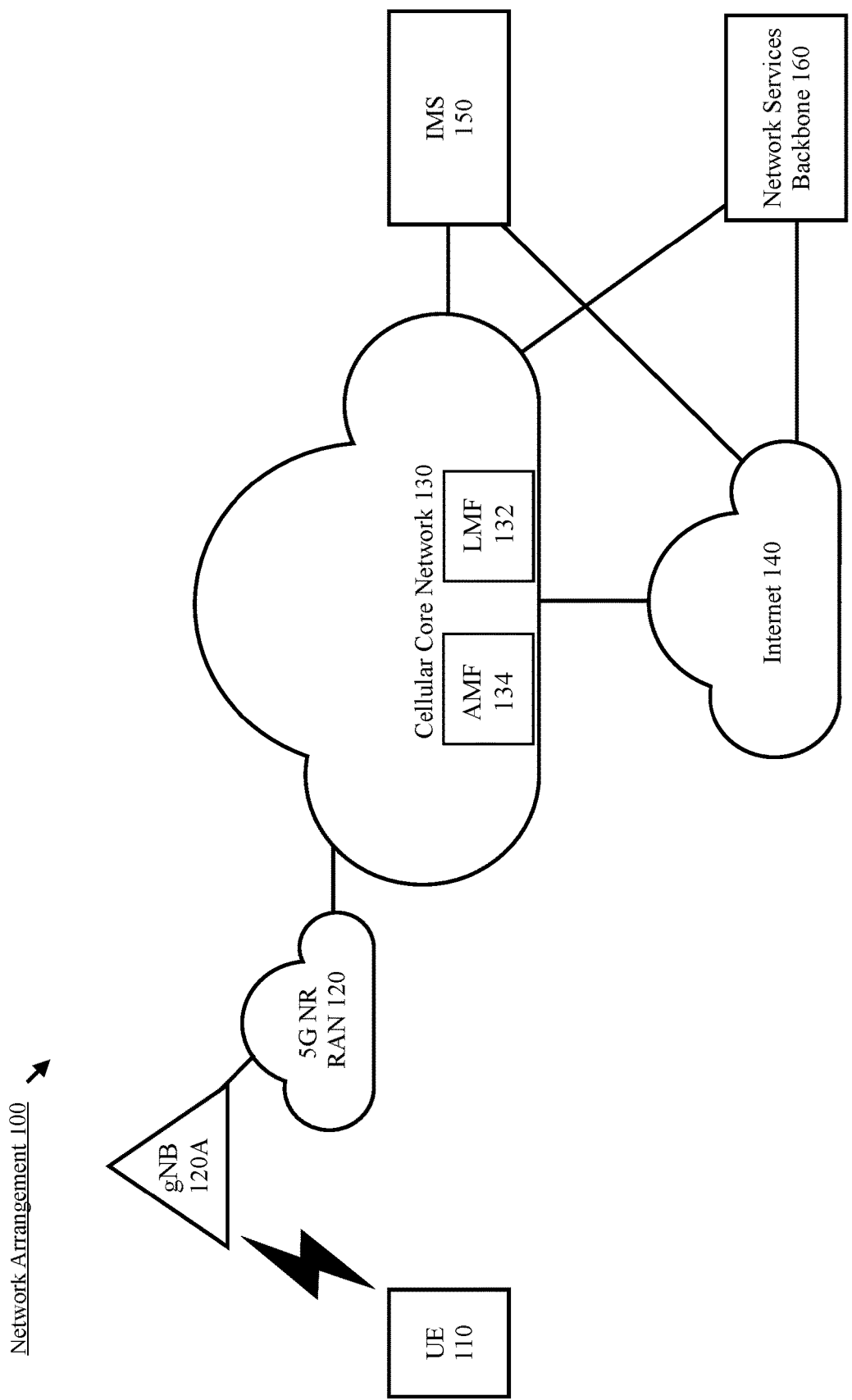
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to improving support for positioning and/or location services for reduced capability (redcap) new radio (NR) devices.

The exemplary embodiments are described with regard to a redcap device. The term "redcap device" generally refers to a third generation partnership program (3GPP) concept for NR devices that have a lower cost and/or complexity compared to legacy NR devices. In some instances, a redcap device may be characterized as a device with lower end capabilities relative to release 16 enhanced mobile broadband (eMBB) devices and ultra-reliable low latency communication (URLLC) devices. To provide some specific examples, a redcap device may be associated with use cases such as, but not limited to, industrial wireless sensors, video surveillance and wearables.

Redcap devices may be configured with complexity reduction features such as, but not limited to, a lower maximum bandwidth compared to legacy NR devices, a reduced number of antenna branches compared to legacy NR devices, half-duplex (HD) frequency division duplex (FDD) capabilities, relaxed processing time compared to legacy NR devices and relaxed processing capability compared to legacy NR devices. These features may provide cost and/or complexity reduction benefits. However, any reference to a redcap device having a particular complexity reduction feature is merely provided for illustrative purposes. There may be different redcap device types and different networks may define redcap devices using different complexity reduction features.

Throughout this description, the terms "user equipment (UE)," "redcap device" and "redcap UE" may be used interchangeably to represent any electronic component that may establish a connection to a network and is equipped with capabilities that may be characterized as 3GPP NR redcap device capabilities. Therefore, the terms "UE," "redcap device" and "redcap UE" as described herein are not used to represent any type of UE. Instead, these terms are used to identify a particular a NR UE that is distinct from a non-redcap device (e.g., a legacy NR UE, etc.). The exemplary embodiments are configured to address issues related to specific aspects of redcap devices (or devices with similar reduced capabilities).

Some of the exemplary embodiments described herein relate to implementing dedicated redcap resources and/or resources that may be shared by redcap and non-redcap devices. Throughout this description, the terms "non-redcap device," "non-redcap UE" and "legacy NR UE" may be used interchangeably to represent any 3GPP NR device excluding 3GPP NR redcap devices.

To determine a UE's location, the UE is provided with positioning reference signals (PRS) from one or more transmission and reception points (TRPs) of the 5G NR network (e.g., from a next generation nodeB (gNB)). The UE measures the resources of the PRS and these measurements are used to determine the location of the UE. In some cases, UE-based positioning is used, e.g., the UE calculates the UE's location based on the PRS measurements. In other cases, network based positioning is used, e.g., the UE sends the measurements to a network function (e.g., location management function) and the network calculates the UE's position. It should be understood that the exemplary embodiments described herein may be applicable to UE based or network based positioning.

However, positioning for redcap UEs may be impacted due to the reduced capability of the redcap UE. For example, a reduced bandwidth may impact the positioning accuracy, the reduced number of receive antennas may impact the redcap UE's capability to accurately measure the PRS, etc. The present disclosure is concerned with design aspects for positioning of a redcap UE. For example, the exemplary embodiments describe positioning operations that may increase the accuracy, the power saving, the type of assistance data and the capability indications of redcap UEs. Each of these exemplary embodiments will be described in greater detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, Internet of Things (IoT) devices, wearables (e.g., medical devices, augmented reality goggles, virtual reality googles, smart watches, etc.), industrial wireless sensors, video surveillance devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). In this example, the cellular core network 130 includes a location management function (LMF) 132 and an access and mobility management function (AMF) 134. Those skilled in the art will understand that an actual cellular core network may include various other components performing any of a variety of different functions.

The LMF 132 performs operations related to positioning such as, but not limited to, configuring PRS signals for the UE 110 to determine and report its location to the radio access network and/or the cellular core network 130. Reference to a single LMF 132 is merely for illustrative purposes, an actual network arrangement may include any appropriate number of LMFs. It should also be understood that while the LMF 132 is shown as being part of the cellular core network 130, the LMF 132 may be a separate component (e.g., one or more servers) outside of but communicatively connected to the cellular core network 130.

The AMF 134 performs operations related to mobility management such as, but not limited to, paging, non-access stratum (NAS) management and registration procedure management between the UE 110 and the cellular core network 130. Reference to a single AMF 134 is merely for illustrative purposes, an actual network arrangement may include any appropriate number of AMFs.

The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
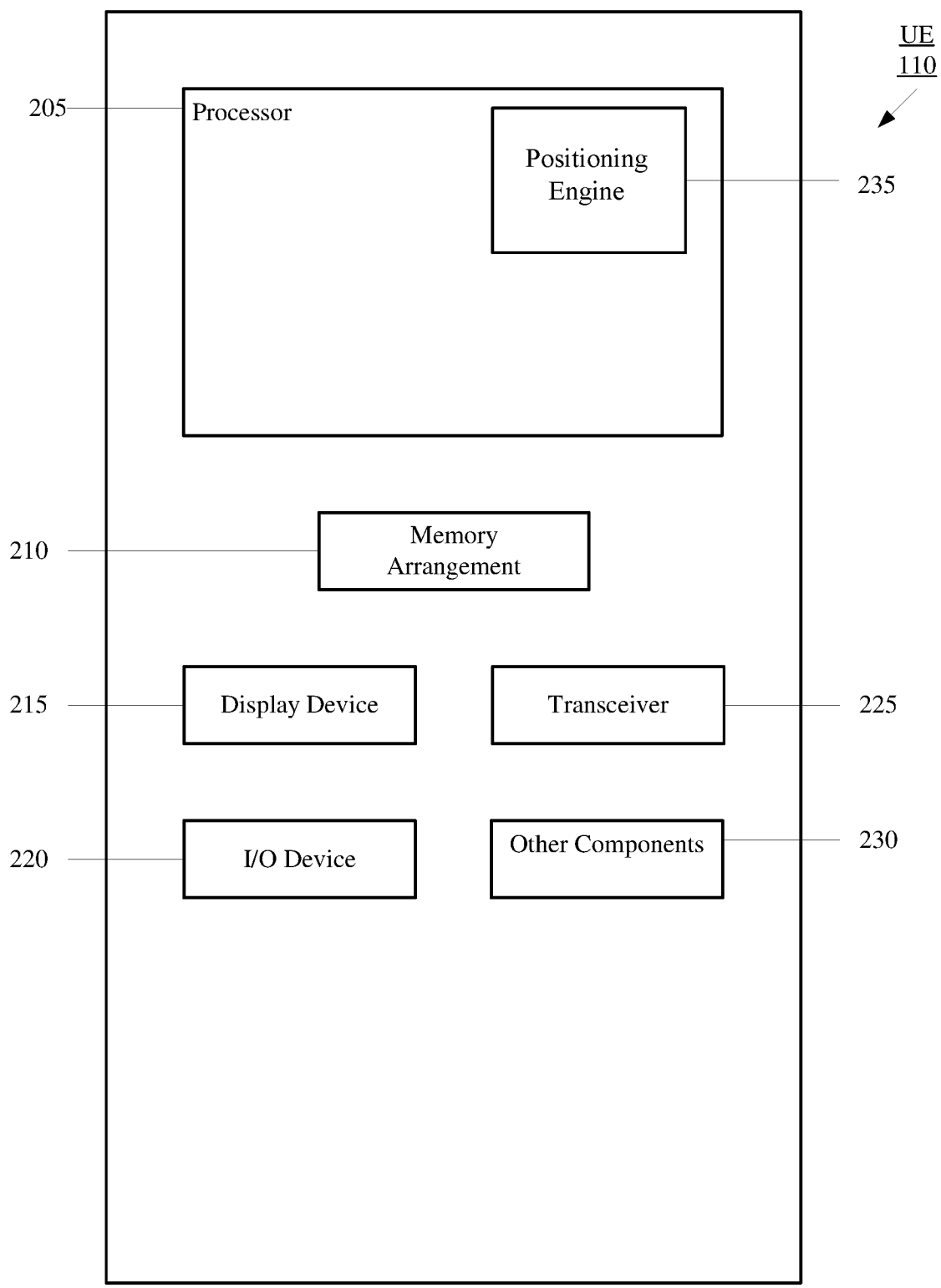
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a positioning engine 235. The positioning engine 235 may perform various operations related to positioning for the UE 110. Examples of these operations will be provided in greater detail below.

The above referenced engine 235 being applications (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
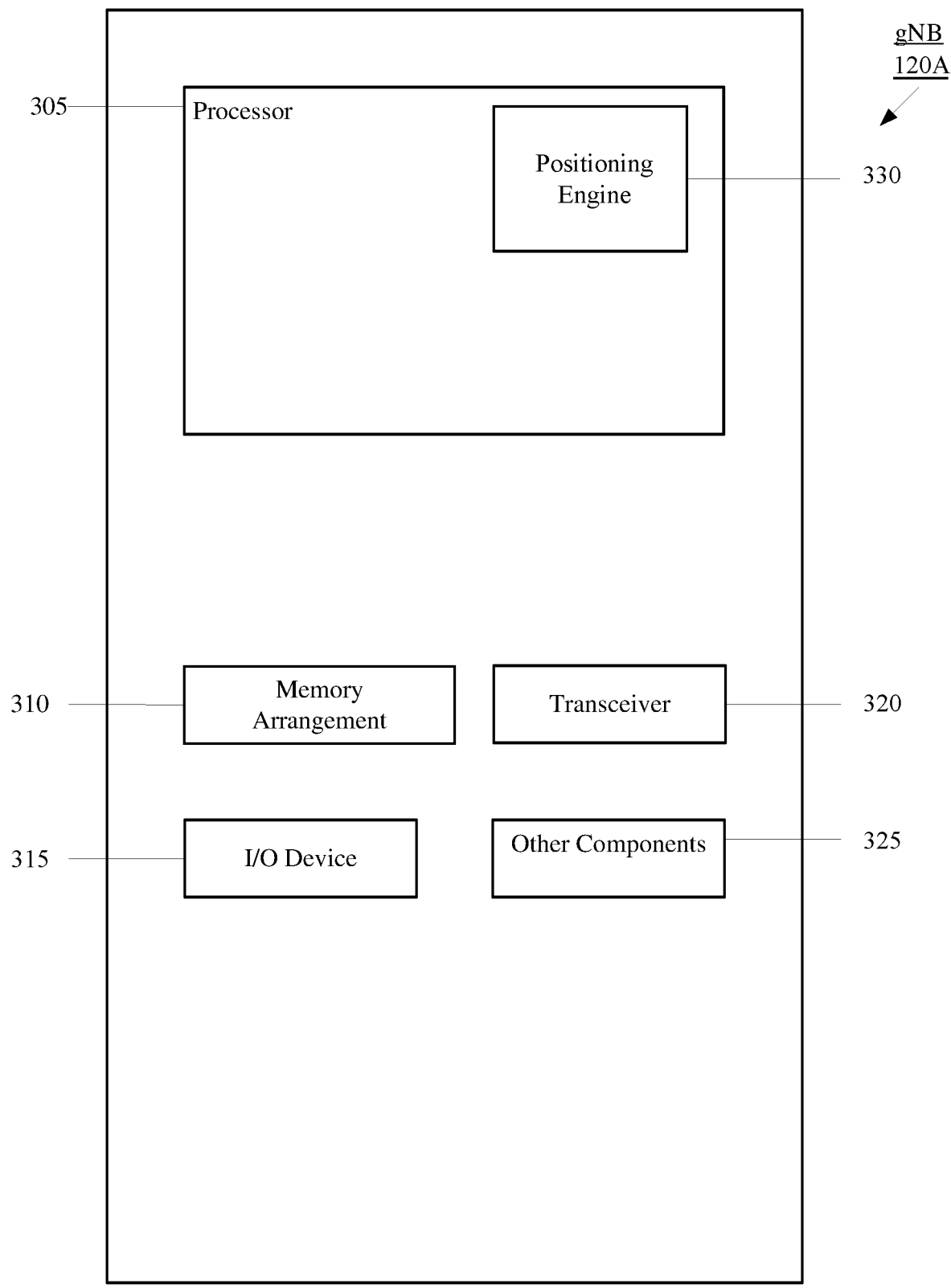
FIG. 3 shows an exemplary base station according to various exemplary embodiments.

FIG. 3 shows an exemplary base station according to various exemplary embodiments. The base station may represent the gNB 120A or any other access node through which the UE 110 may establish a connection and manage network operations.

The gNB 120A may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a positioning engine 330. The positioning engine 330 may perform various operations related to positioning for the UE 110. Examples of these operations will be provided in greater detail below.

The above noted engine 330 being an application (e.g., a program) executed by the processor 305 is only exemplary. The functionality associated with the engine 330 may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the gNB 120A. The I/O device 315 may be a hardware component or ports that enable a user to interact with the gNB 120A. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

As will be described in more detail below, the exemplary embodiments introduce various positioning operations that may be performed by the redcap UE 110 and the scenarios in which each of the various operations may be performed. It should be understood that the following exemplary embodiments are described with reference to downlink positioning reference signals (DL-PRS). However, it should be understood that the redcap UE 110 may also transmit uplink reference signals (RS) for positioning purposes, e.g., sounding reference signals (SRS). One or more of the positioning operations described below for the DL-PRS may also be applied to the transmission of SRS. Furthermore, some exemplary positioning operations that may be performed by the redcap UE 110 include buffering of PRS upon receipt, processing PRS, transmitting measurement reports for the PRS, etc. As will be described in detail below, each exemplary scenario may include different type of positioning operations, even including omitting performing certain operations. Thus, it should be understood that the above are only general examples of positioning operations.

Figure 4:
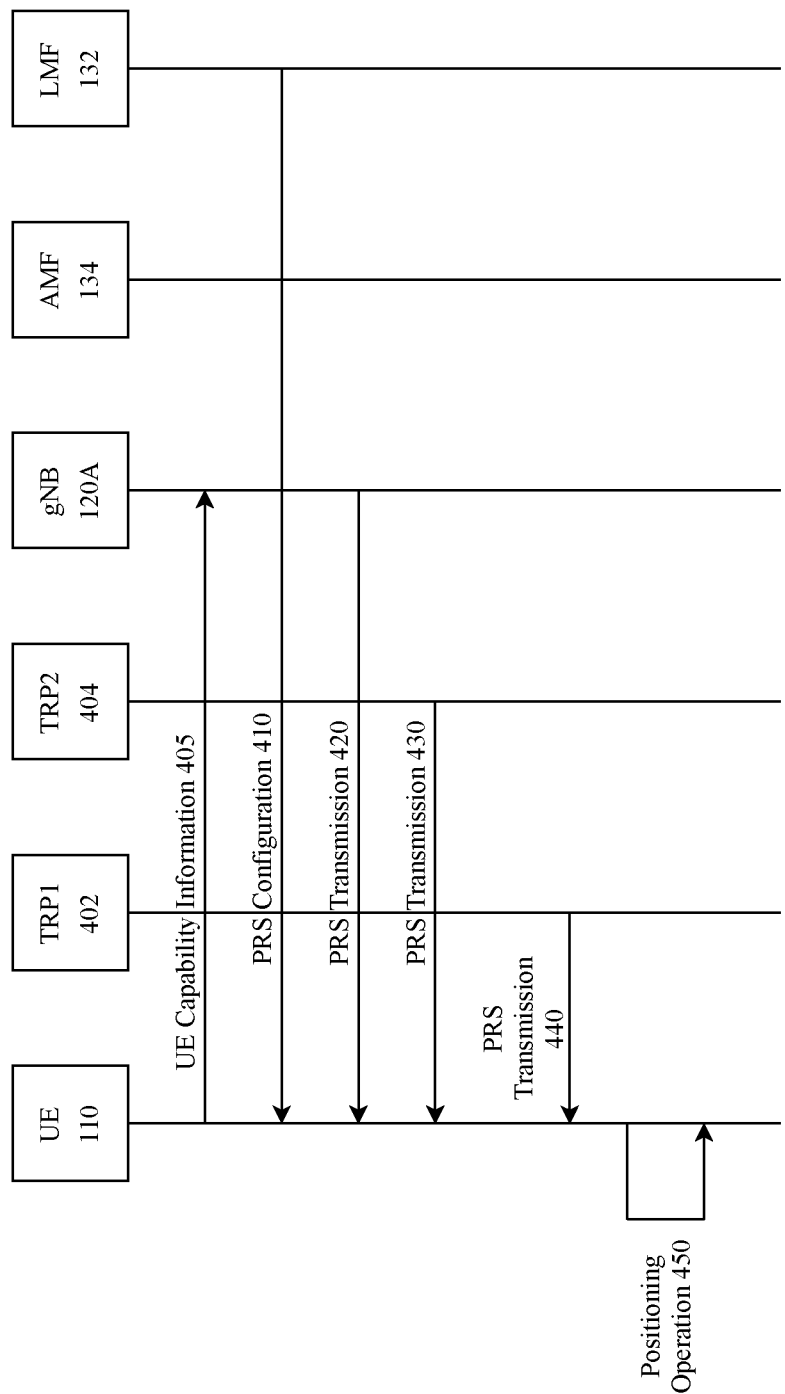
FIG. 4 shows an exemplary signaling diagram illustrating the configuration of positioning reference signals (PRSs) for a UE according to various exemplary embodiments.

FIG. 4 shows an exemplary signaling diagram 400 illustrating the configuration of positioning reference signals (PRSs) for a UE according to various exemplary embodiments. The signaling diagram 400 assumes that the redcap UE 110 has successfully connected to the 5G NR-RAN 120 via the gNB 120A. This means that the cellular core network 130 including the LMF 132 and the AMF 134 may communicate with the redcap UE 110. In addition, in this example, it may be considered that the redcap UE 110 may receive PRS from the gNB 120A and from two additional TRPs (TRP1 402 and TRP2 404). However, it should be understood that the example of three TRPs (gNB 120A, TRP1 402 and TRP2 404) is only exemplary and that more or less TRPs may be configured to transmit PRS for the redcap UE 110.

In 405, the redcap UE 110 sends capability information to the gNB 120A. This capability information may be provided as part of a connection procedure, in response to a general request for the UE capabilities or as part of a specific request for the UEs positioning capabilities. Thus, the capability information may include the capabilities of the UE with respect to measuring PRS, e.g., active bandwidth part (BWP), buffering and processing capabilities, etc. Some examples of redcap UE positioning capabilities are described in greater detail below.

In 410, the LMF 132 configures PRS resources (or resource sets) for the redcap UE 110 as part of a location assistance data message. In other embodiments, the PRS configuration may be provided by a positioning system information block (posSIB) broadcast by the gNB 120A. The PRS configuration may include parameters for the PRS such as, for example, a starting physical resource block (PRB), comb size, slot offset, symbol offset, number of symbols, periodicity, number of repetitions, etc.

In 420-440, the respective TRP will transmit the PRS according to the PRS configuration received from the LMF 132. In 450, the redcap UE 110 will perform a positioning operation. As will be described in greater detail below, the positioning operation 450 may include a variety of operations depending on the capabilities, the configuration and/or the deployment of the UE 110.

In some exemplary embodiments, the PRS configuration indicates the redcap UE 110 is to perform PRS measurements in a measurement gap. In some scenarios, the bandwidth of the configured PRS is larger than the bandwidth capability of the redcap UE 110. In this scenario, there may be various alternative positioning operations 450 performed by the redcap UE 110. In a first alternative, the redcap UE 110 is not expected to measure the PRS. In a second alternative, the redcap UE 110 only measures the portion of PRS that lies within the capability of the redcap UE, e.g., the bandwidth capability of the redcap UE 110. In a third alternative, the redcap UE 110 may relax the bandwidth operation to be more than the indicated capability of the redcap UE within the measurement gap, e.g., if the indicated bandwidth is 20 MHz, the redcap UE 110 may relax this to be more than 20 MHz in the measurement gap.

In other exemplary embodiments, the PRS configuration indicates the redcap UE 110 is to perform PRS measurements within the current active bandwidth part (BWP). The bandwidth of the PRS may be larger than active BWP capability of the redcap UE 110. Again, in this scenario, there may be various alternative positioning operations 450 performed by the redcap UE 110. In a first alternative, the redcap UE 110 is not expected to measure the PRS. In a second alternative, the redcap UE 110 only measures the portion of PRS that lies within the active BWP of the redcap UE 110.

In any of the exemplary embodiments described above, the redcap UE 110 may be indicated to report the PRS measurements with the Physical Uplink Shared Channel (PUSCH) (or the Physical Sidelink Shared Channel (PSSCH) when the redcap UE 110 is out of coverage). The minimum time between the last symbol of the PRS reception and the first symbol of uplink (UL) resource for sending the measurement report depends on the positioning processing capability of the redcap UE 110. In some embodiments, the redcap UE 110 does not expect to multiplex uplink control information (UCI) on the PUSCH as part of the reporting of the positioning operations 450. In other embodiments, the PUSCH grant associated with a PRS measurement window may multiplex only high priority Hybrid Automatic Repeat Request Acknowledgment (HARQ-ACK) or Scheduling Requests (SR), if any exist. Other lower priority UCI information (e.g., low priority HARQ-ACK/SR, Channel State Information I (CSI I), CSI II, etc.) may be dropped.

As described above, in some exemplary embodiments, the PRS configuration may indicate that the redcap UE 110 is to perform PRS measurements within the current active BWP. In this scenario, a redcap UE 110 operating in half duplex frequency division duplexing (HD-FDD) may not be expected to transmit configured UL transmissions (e.g., periodic sounding reference signals (SRS), configured grant PUSCH (CG-PUSCH), etc.) or to receive configured downlink (DL) receptions (e.g., CSI-RS, Semi-Persistent Scheduling Physical Downlink Shared Channel (SPS-PDSCH), etc.) within a buffering window or a processing window for the PRS. Overlapping of signals may be allowed but the redcap UE 110 may only process the PRS.

In the scenario where the redcap UE 110 is to perform PRS measurements within the current active BWP, a HD-FDD redcap UE 110 does not expect to transmit dynamically indicated UL transmission (e.g., aperiodic-SRS (A-SRS), dynamic grant PUSCH (DG-PUSCH), Physical Uplink Control Channel (PUCCH) associated with DG-PDSCH, etc.) or to receive dynamically indicated DL reception (e.g., DG-PDSCH) within the buffering window or processing window, if the PRS or BWP for measurement is also dynamically indicated. In this case, overlapping of signals is not allowed. In the scenario when PRS or BWP for positioning are not associated with downlink control information (DCI), the redcap UE 110 is not expected to receive the PRS or transmit the associated measurement reports for the PRS.

In some exemplary embodiments, the redcap UE 110 may need to transmit a Physical Random Access Channel (PRACH) that collides with the PRS reception. In some exemplary embodiments, the redcap UE 110 is not expected to receive the PRS. In other exemplary embodiments, the PRACH may be dropped if the PRACH resource collides with the PRS reception window and/or processing window. The selection of dropping the PRACH may depend on a priority associated with the RACH and/or a required accuracy for positioning.

In some exemplary embodiments, the redcap UE 110 may need to transmit a Scheduling Request (SR) that collides with PRS operations. In some exemplary embodiments, if the SR overlaps in time within the buffering window or processing window for the PRS or collides with PRS transmission, the redcap UE 110 may prioritize PRS operations over SR (or vice versa) depending on the priority of the logical channel (LCH) triggering the SR. In other exemplary embodiments, the SR may always de-prioritized if the PRS is associated with a DCI.

As described above, some redcap UEs 110 may indicate a capability to receive and process PRS within the active BWP. In this scenario, the processing window length for the PRS may be defined based on the redcap UE 110 capability, e.g., the redcap UE 110 indicates up to Q PRS symbols is expected within a P symbols of a processing window. The capability indication may include several pairs of (Q,P). The processing window starting symbol may be determined based on the first PRS symbol to be received within the active BWP. For example, the processing window starts at the first PRS symbol indicated to be received within the window. In another example, the processing window may start N symbols before the first PRS symbol. In this example, the N symbols provides the redcap UE 110 time to finish ongoing processing on previously received data/signals/channels in the buffer. The value of N may depend on the redcap UE 110 capabilities. For example, N may be based on Ni symbols based on Cap 1/2 UEs or a new value.

In some exemplary embodiments, the positioning operations 450 may include power saving operations. For example, an On Duration of a discontinuous reception cycle (DRX) may be aligned with the PRS occasions within a measurement gap. In some exemplary embodiments, the LMF 132 may provide a proposed DRX configuration for the redcap UE 110 to the gNB 120A based on the PRS configuration determined by the LMF 132. In this manner, the On Duration may be aligned with the UE-specific PRS configurations, meaning the redcap UE 110 would not have to wake up outside the On Duration to measure the PRS. In other exemplary embodiments, the serving gNB (e.g., gNB 120A) informs the LMF 132 of the DRX configuration for the redcap UE 110. This DRX configuration may then be forwarded to neighboring gNBs (e.g., TRP1 402 and TRP2 404) by the LMF 132 so the neighboring gNBs may align the PRS configuration to the redcap UE 110.

In other exemplary embodiments, the redcap UE may not be expected to perform PRS measurements in the DRX off duration. In still further exemplary embodiments, the redcap UE 110 may relax the off duration and perform PRS measurements within the off duration, depending on the redcap UE 110 capability, and a required positioning accuracy. It should be understood that whenever a required positioning accuracy is referred to in this disclosure, it is referring to whether the positioning accuracy for the redcap UE 110 has priority over other operations that the redcap UE 110 is currently performing. For example, if the redcap UE 110 is executing an emergency application that requires a high accuracy location, the positioning operations may take priority over other operations. The specific priorities of any particular application or operation is outside the scope of this disclosure.

In the current 3GPP standards, a gNB (e.g., gNB 120A) may broadcast assistance data information, received from an LMF, in positioning System Information messages (e.g., PosSIB). However, in some scenarios, the PRS configurations for non-redcap UEs in the posSIB are not usable for redcap UEs. Thus, in some exemplary embodiments, new assistance data for redcap UEs may be transmitted by the gNB. This new assistance data may be termed a redcap PosSIB (R-PosSIB). The PRS configurations within the R-PosSIB may be specifically designed for redcap devices. For example, the assistance data may include a bandwidth limited to 20 MHz, shorter periodicities, and/or association to more TRPs. The shorter periodicities and/or association to multi-TRPs may compensate for lost accuracy due to the smaller bandwidth. In addition, the redcap UE 110 may request the R-PosSIB, at least for the Radio Resource Control (RRC) connected state. The request may include an indication of an acceptable bandwidth for the PRS. It should be understood that non-redcap UEs may also perform and report measurements on PRS configurations indicated by the R-PosSIB.

As described above, the redcap UE 110 may provide positioning capability information to the 5G NR RAN 120 and/or cellular core network 130 via the gNB 120A. These positioning capabilities may differ from non-redcap UEs. For example, the positioning capability may include a maximum supported PRS bandwidth that redcap UE 110 may receive. This bandwidth may be explicitly reported or implicitly tied to the redcap UE 110 bandwidth. In some examples, this maximum supported bandwidth may be 20 MHz or a fraction of 20 MHz.

In another example, the positioning capability may include a PRS buffering capability. In a further example, values of (N, T) may be provided, where N is the duration of PRS symbols in units of ms a UE can process every T ms assuming the maximum PRS bandwidth in MHz, which is supported and reported by UE. The values of (N, T) may be from a reduced set and/or with new numbers. To provide some specific example, T may include the set of values {20, 30, 40, 80, 160, 320, 640, 1280}ms; and N may include the set of values {0.125, 0.25, 0.5, 1, 2, 4, 6, 8, 12, 16, 20, 25, 30, 32, 35, 40, 45, 50}ms. In further exemplary embodiments, different (N,T) sets may be reported depending on the RS type, e.g., PRS vs sounding reference signal (SRS), or positioning technique (e.g., OTDOA, AOA, AOD, etc.).

In a further example, the positioning capability may include a maximum number of PFLs. This number may be reduced for the redcap UE 110, e.g., to 1. This value may be across all positioning methods and across all bands. Another example of a reported positioning capability may be a maximum number of PRS resources the redcap UE 110 may process. Again, this value may depend on the RS type and/or positioning technique.

EXAMPLES

In a first example, a processor of a reduced capability (redcap) user equipment (UE) is configured to perform operations comprising receiving a positioning reference signal (PRS) configuration from a network component and performing one or more positioning operations based at least in part on the PRS configuration.

In a second example, the processor of the first example, wherein the PRS configuration indicates the redcap UE is to perform the positioning operations within a current active bandwidth part (BWP) of the redcap UE.

In a third example, the processor of the second example, wherein the redcap UE is further configured to transmit a scheduling request (SR) that collides with one of i) a reception of the PRS or (ii) a transmission of a sounding reference signal (SRS) by the redcap UE.

In a fourth example, the processor of the third example, wherein the positioning operations comprise dropping the SR based on a priority of a logical channel (LCH) triggering the SR.

In a fifth example, the processor of the third example, wherein the positioning operations comprise dropping the SR based on the PRS being activated by downlink control information (DCI).

In a sixth example, the processor of the third example, wherein the positioning operations comprise omitting the one of i) the reception of the PRS or (ii) the transmission of a sounding reference signal (SRS) by the redcap UE based on a priority of a logical channel (LCH) triggering the SR.

In a seventh example, the processor of the first example, wherein the operations further comprise providing an indication that the redcap UE is capable of receiving and processing the PRS within the active bandwidth part (BWP) of the redcap UE.

In an eighth example, the processor of the seventh example, wherein the operations further comprise providing an indication of a processing window for the redcap UE to process the PRS based on a number (Q) of PRS symbols expected within a number (P) symbols of the processing window.

In a ninth example, the processor of the eighth example, wherein a starting symbol of the processing window is based on a first PRS symbol to be received within the active BWP.

In a tenth example, the processor of the eighth example, wherein a starting symbol of the processing window is based on a number (N) of symbols prior to a first PRS symbol to be received within the active BWP, wherein N is based on at least a capability of the redcap UE.

In an eleventh example, the processor of the first example, wherein the redcap UE is configured to operate in a discontinuous reception (DRX) cycle.

In a twelfth example, the processor of the eleventh example, wherein the positioning operations comprise omitting measuring the PRS during an off duration of the DRX cycle.

In a thirteenth example, the processor of the eleventh example, wherein the positioning operations comprise waking up the redcap UE during an off duration of the DRX cycle to measure the PRS.

In a fourteenth example, the processor of the first example, wherein the operations further comprise receiving, from a base station, positioning assistance information, wherein the positioning assistance information is received via a reduced capability positioning system information block (R-PosSIB) broadcast by the base station, wherein the R-PosSIB comprises one of a limited bandwidth for the PRS, a shorter periodicity of the PRS or an association of the PRS to more transmission and reception points (TRP) than for a non-redcap UE.

In a fifteenth example, the processor of the fourteenth example, wherein the operations further comprise transmitting a request for the R-PosSIB, wherein the request comprises an indication of an expected bandwidth for the PRS.

In a sixteenth example, the processor of the first example, wherein the operations further comprise providing an indication of a capability of the redcap UE with respect to the PRS.

In a seventeenth example, the processor of the sixteenth example, wherein the capability comprises one of (i) a maximum supported PRS bandwidth, (ii) a PRS buffering capability, (iii) a PRS processing capability, (iv) a maximum number of number of PFLs, and (v) a maximum PRS resources the redcap UE can process.

In an eighteenth example, a processor of a base station is configured to perform operations comprising receiving, from a location management function (LMF) of a network, a positioning reference signal (PRS) configuration for a reduced capability user equipment (redcap UE) and transmitting PRS to the redcap UE based on the PRS configuration.

In a nineteenth example, the processor of the eighteenth example, wherein the operations further comprise broadcasting positioning assistance information via a reduced capability positioning system information block (R-PosSIB), wherein the R-PosSIB comprises one of a limited bandwidth for the PRS, a shorter periodicity of the PRS or an association of the PRS to more transmission and reception points (TRP) than for a non-redcap UE.

In a twentieth example, the processor of the nineteenth example, wherein the operations further comprise receiving, from the redcap UE, a request for the R-PosSIB, wherein the request comprises an indication of an expected bandwidth for the PRS.

In a twenty first example, the processor of the eighteenth example, wherein the redcap UE is configured to operate in a half-duplex frequency division duplexing (HD-FDD) mode, and wherein the PRS configuration indicates the redcap UE is to perform the positioning operations within a current active bandwidth part (BWP) of the redcap UE.

In a twenty second example, the processor of the twenty first example, wherein the operations further comprise omitting scheduling a dynamic grant for the redcap UE that overlaps in time with the PRS.

In a twenty third example, the processor of the twenty first example, wherein the operations further comprise scheduling a dynamic grant for the redcap UE when the PRS is not associated with downlink control information (DCI), wherein the dynamic grant indicates to the redcap UE that the redcap UE is not expected to receive the PRS in a time where the dynamic grant is scheduled.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of a reduced capability (redcap) user equipment (UE) configured to perform operations comprising:
   receiving, from a network, a positioning reference signal (PRS) configuration comprising resources for PRS;
   receiving a discontinuous reception (DRX) cycle configuration from the network, wherein the PRS are configured to align with an On Duration of the DRX cycle; and
   performing one or more positioning operations based at least in part on the PRS configuration.

2. The processor of claim 1, wherein the PRS configuration indicates the redcap UE is to perform the positioning operations in a measurement gap and wherein a configured bandwidth of the PRS is greater than an indicated bandwidth capability of the redcap UE.

3. The processor of claim 2, wherein the positioning operations comprise the redcap UE omitting measurement of the PRS.

4. The processor of claim 2, wherein the positioning operations comprise measuring a portion of the PRS that are within the indicated bandwidth capability of the redcap UE.

5. The processor of claim 1, wherein the PRS configuration indicates the redcap UE is to perform the positioning operations within a current active bandwidth part (BWP) of the redcap UE and a configured bandwidth of the PRS is greater than the current active BWP of the redcap UE.

6. The processor of claim 5, wherein the positioning operations comprise omitting measurement of the PRS.

7. The processor of claim 5, wherein the positioning operations comprise measuring a portion of the PRS that are within the active BWP of the redcap UE.

8. The processor of claim 1, wherein the positioning operations comprise transmitting a measurement report for the PRS on a Physical Uplink Shared Channel (PUSCH), wherein the PUSCH selected for transmitting the measurement report is based on a time between a last symbol of the PRS reception and a first symbol of the PUSCH, wherein the time is based on a processing capability of the redcap UE.

9. The processor of claim 8, wherein the measurement report is not multiplexed with any uplink control information (UCI) on the PUSCH.

10. The processor of claim 8, wherein the measurement report is multiplexed with one or more of a high priority Hybrid Automatic Repeat Request Acknowledgement (HARQ-ACK) or a high priority scheduling request (SR).

11. The processor of claim 1, wherein the PRS configuration indicates the redcap UE is to perform the positioning operations within a current active bandwidth part (BWP) of the redcap UE.

12. The processor of claim 11, wherein the redcap UE is configured to operate in a half-duplex frequency division duplexing (HD-FDD) mode, the positioning operations comprise omitting transmission of configured uplink (UL) transmissions and reception of configured downlink (DL) receptions within a PRS buffering window and a PRS processing window.

13. The processor of claim 11, wherein the redcap UE is configured to operate in a half-duplex frequency division duplexing (HD-FDD) mode, the positioning operations comprise omitting transmission of dynamically indicated UL transmissions and reception of dynamically indicated DL receptions within a PRS buffering window and a PRS processing window.

14. The processor of claim 13, wherein the positioning operations further comprise omitting measurement of the PRS.

15. The processor of claim 11, wherein the redcap UE is further configured to transmit a Physical Random Access Channel (PRACH) transmission that collides with reception of the PRS, the positioning operations comprise omitting reception of the PRS.

16. The processor of claim 11, wherein the redcap UE is further configured to transmit a Physical Random Access Channel (PRACH) transmission that collides with reception of the PRS, the positioning operations comprise dropping the PRACH transmission.

17. A processor of a base station configured to perform operations comprising:
   receiving, from a location management function (LMF) of a network, a positioning reference signal (PRS) configuration comprising resources for PRS for a reduced capability user equipment (redcap UE);
   configuring a discontinuous reception (DRX) cycle for the redcap UE, wherein the DRX cycle is based on the PRS configuration received from the LMF and wherein the PRS are configured to align with an On Duration of the DRX cycle; and
   transmitting PRS to the redcap UE based on the PRS configuration.

18. A location management function of a network configured to perform operations comprising:
   determining a positioning reference signal (PRS) configuration for a reduced capability user equipment (redcap UE) communicating with the network;
   transmitting the PRS configuration to the redcap UE;
   receiving, from a base station serving the redcap UE, a discontinuous reception (DRX) cycle configuration for the redcap UE; and
   transmitting the DRX cycle configuration of the redcap UE to one or more neighboring base stations to the serving base station, wherein the one or more neighboring base stations align a PRS configuration for the redcap UE based on the DRX cycle configuration.

* * * * *